United States Patent [19]

Wu

[11] Patent Number: 4,587,156

[45] Date of Patent: May 6, 1986

[54] DIRECTLY PRINTABLE PRESSURE-SENSITIVE ADHESIVE TAPE

[75] Inventor: Maan-shii S. Wu, Cottage Grove, Minn.

[73] Assignee: Minnesota Mining and Manufacturing Company, St. Paul, Minn.

[21] Appl. No.: 692,366

[22] Filed: Jan. 22, 1985

Related U.S. Application Data

[63] Continuation-in-part of Ser. No. 585,413, Mar. 2, 1984, abandoned.

[51] Int. Cl.$^4$ .............................. B32B 5/16; C09J 7/02
[52] U.S. Cl. ...................................... 428/207; 106/169; 106/195; 106/196; 428/343; 428/352; 428/354; 428/355; 428/483; 428/516
[58] Field of Search ................... 428/195, 207, 476.3, 428/352, 355, 343, 354, 483, 516; 106/169, 195, 196

[56] References Cited

U.S. PATENT DOCUMENTS

| | | | |
|---|---|---|---|
| 3,543,920 | 12/1970 | Crocker et al. | 428/195 |
| 3,681,105 | 8/1972 | Milutin | 428/195 |
| 3,928,690 | 12/1975 | Settineri et al. | 428/40 |
| 3,967,031 | 6/1976 | Lambert | 428/352 X |
| 3,978,274 | 8/1956 | Blum | 428/476.3 |
| 4,070,523 | 1/1978 | Blum et al. | 428/352 |
| 4,421,817 | 12/1983 | Pina et al. | 428/207 |
| 4,424,244 | 1/1984 | Puskadi | 428/40 |

*Primary Examiner*—Thomas J. Herbert
*Attorney, Agent, or Firm*—Donald M. Sell; James A. Smith; David L. Weinstein

[57] ABSTRACT

A directly printable backsize coating composition for a pressure-sensitive adhesive tape comprising a layer of a low adhesion backsize compound, an ink anchoring resin, and a primer resin wherein the surface free energy of the ink anchoring resin and the primer are within about 10 percent of the surface free energy of the low adhesion backsize compound.

8 Claims, No Drawings

DIRECTLY PRINTABLE PRESSURE-SENSITIVE ADHESIVE TAPE

CROSS REFERENCE TO RELATED APPLICATION

This application is a continuation-in-part application of Ser. No. 585,413, filed Mar. 2, 1984, now abandoned.

FIELD OF THE INVENTION

A pressure-sensitive adhesive tape containing a directly printable backsize coating.

BACKGROUND ART

While pressure-sensitive adhesive (PSA) tapes were introduced to the market more than fifty years ago, the problems associated with adhesive transfer from "face-side" to "backside" of the tape backing were not seriously addressed until the 1950's. By that time, continuous improvements in the adhesive coatings and the introduction of non-fibrous, film-type backings introduced problems associated with the ease of release without attendant loss of adhesion. These problems were addressed by the teachings found in a variety of PSA tape patents. Outstanding among these patents, principally directed to low adhesion backsizes (LAB) were U.S. Pat. No. 2,496,349, which disclosed a hydrocarbon wax-butyral composition; U.S. Pat. No. 2,532,011 introduced a polyvinyl carbamate composition; U.S. Pat. No. 2,607,711, which disclosed a copolymer of a higher-alkyl acrylate or higher-alkyl methacrylate monomer ester and at least one ethylenically unsaturated monomer (preferably acrylic acid or methacrylic acid); U.S. Pat. No. 2,876,894, which disclosed a vinyl stearate/maleic anhydride release coating; and U.S. Pat. No. 3,318,852, which was the first commercial embodiment of an LAB utilizing a fluorine-containing copolymer.

At about the same time that the LAB coatings were being developed, problems were being noted in connection with PSA tape backings which were alleged to be "directly printable". Initially, paper backings were reasonably easy to print and the inks utilized therewith were similar to those from other paper printing applications. When the non-fibrous, film tape backings appeared, new problems became apparent. Such problems were solved in a variety of ways. Virtually thousands of ink formulations were developed to meet the requirements which were peculiar to printing on flexible film tape backings, which were marketed in roll form. Today, there are many well-known so-called flexographic inks.

Problems with direct printability varied from the hydrophilic backings of the regenerated cellulose-type, the less polar cellulose esters, plasticized or unplasticized polyvinyl chloride, and polyesters, to the hydrophobic polyolefins. These backings were employed in applications which required high tensile strength and resistance to unfavorable environments.

At this time, patents began to appear which dealt with printable tapes of varied backing compositions. Modifications of release properties and anchorage properties for the printed image were accomplished by additives included in the backsize coatings or by multilayered coatings followed by post-treatment of the printed tape to enhance image anchorage. U.S. Pat. No. 2,819,169 discloses a methacrylate "mirror coating" which assertedly permits conventional flexographic inks to be printed on cellulose acetate film backings where the PSA utilized is a natural or synthetic rubber composition. This patent also discloses a slightly less effective nitrocellulose "mirror coating".

Canadian Pat. No. 772,120 relied upon a thin ethyl acrylate/methacrylate copolymer coating to provide a printable unplasticized polyvinyl chloride-backed PSA tape; German OLS No. 2,018,929 discloses a printable and releasable backsize comprised of a blend of ethyl acrylate/methyl methacrylate and vinylidine chloride/acrylonitrile which was limited to polyvinyl chloride backings. In U.S. Pat. No. 3,543,920 there is disclosed a copolymer of stearyl methacrylate/acrylonitrile which is used as a compatible release material with standard film formers to provide a printable surface for paper and polyester film backings.

U.S. Pat. Nos. 3,681,105 and 3,773,538 disclose "transfer-proof" inks for PSA tape backings which utilize surface active compounds comprised of perfluorinated alkyl groups and complexes of fatty acids with aluminum, chromium or titanium in combination with conventional flexographic ink film binders to assertedly prevent offsetting of the ink from cellophane film.

U.S. Pat. No. 3,967,031 discloses a printable PSA tape which uses a blend of cellulose acetate butyrate and a copolyester or acrylic ester to provide "low unwind" and printability for unplasticized polyvinyl chloride and polyester backed films. U.S. Pat. No. 3,978,274 discloses a smoother unwind of a printable PSA tape by employing a ternary resin system of a vinyl film former, a hard thermoplastic acrylic resin and a polyamide plasticizing resin alleged to perform well with cellulose acetate and polyester film backings. U.K. Pat. No. 2,116,074 discloses a printable polypropylene-backed PSA tape which is obtained by a process which involves (a) corona priming of polypropylene backing, (b) coating with a lacquer based on (1) acrylate-chloroaceto-vinyl, or (2) polyurethane or (3) polyamide; then (c) printing thereon with a flexographic ink; and finally, (d) overcoating with a release coating of polyvinyl carbamate-based release material.

Despite the considerable prior art in the problem areas discussed above, there is no teaching of the unique combination of an LAB of excellent efficiency in combination with ink anchoring and primer resins. By combining these normally incompatible components to prepare a backsize solution which can be applied as a coating in a single step, I have accomplished a feat which has long been desired.

DISCLOSURE OF THE INVENTION

In accordance with the invention, there is provided a backsize coating for a pressure-sensitive tape, the backsize coating comprising a mixture of a low adhesion backsize compound, an ink anchor resin, and a primer, wherein the ink anchor resin and the primer have a surface energy which is within 10 percent of the surface energy of the low adhesion backsize compound.

By utilizing the surface energies of the components as a selection criteria, I have found that a backsize can be prepared exhibiting excellent properties for direct printing thereon, retention of the printed image, and also satisfactory release characteristics.

DETAILED DESCRIPTION

The PSA tape of my invention is a high performance packaging and identification tape which utilizes a polypropylene, polyethylene terephthalate, or unplasticized polyvinyl chloride film backing which has been rendered "directly printable". It has overcome the objectionable tendency to transfer printed matter from "backside" to "faceside", which occurs with inferior tapes when they are unrolled from a dispenser and applied to the surface of an article. In this instance, the printed tape functions in a dual capacity as a packaging or holding tape as well as a printed identification or instructed message.

For future reference and clarity in understanding my invention, the film backing of my tape has two principal surfaces. The surface bearing the functional PSA layer is referred to as the "faceside" of the tape, while the surface bearing the printing ink, which is the LAB surface, is referred to as the "backside".

Current packaging tapes have achieved a level of performance which imposes drastic constraints on those tapes which must of necessity be printable and carry a sharp, clear imprinted message from the tape roll to the surface upon which the tape is to be applied. Most printing of tapes today is accomplished at high speeds using flexographic ink formulations which have been adapted to commercial printing equipment and the type of backing upon which the ink is to be applied. Commercial distribution of printable packaging tapes requires that the tape be shipped to a converter who then applies the printed indicia, in turn selling the printed tape in dispensable roll form to the ultimate customer. At this stage, the tape may be subjected to reasonably lengthy periods of storage at moderately elevated temperatures, such as experienced under conventional warehousing conditions. During this time, the highly aggressive pressure-sensitive adhesive is in direct contact with the underlying printed surface, which provides ample opportunity for the adhesive to aggressively adhere to the ink layer, resulting in offsetting of the ink when the tape is ultimately dispensed from the roll. The means for insuring sufficient anchorage of the printed matter to prevent this ink transfer, and the means for promoting satisfactory release of the adhesive layer from the underlying coating when the tape is in roll form are in essence diametrically opposed. Attempts to balance these opposing forces in the prior art have been accomplished by sequential coating, which involves post treatment and additional processing steps which complicate the production of such tapes and increase the expense thereof.

Conversely, in my invention, the tapes have been made "directly" printable. This term means that the printed ink remains anchored to the tape backside while the pressure-sensitive adhesive releases from the printed surface easily without "picking" or transferring of the printed matter to the pressure-sensitive adhesive. Such is accomplished without additional post printing treatment such as heat, pressure, radiation or additional overcoating of a release-promoting layer.

My invention involves the proper selection of a ternary component mixture to prepare an easy-release backsize coating which will allow direct printability and yet avoid the attendant problems noted above. The first component thereof is a low adhesion backsize, or LAB, which is preferably selected from the group consisting of a higher-alkyl acrylate or higher-alkyl methacrylate ester copolymerized with at least one ethylenically unsaturated monomer, preferably acrylic and methacrylic acid, as is described in U.S. Pat. No. 2,607,711, incorporated herein by reference, or a terpolymer of (1) an ethylenically unsaturated monomer containing a fluoroalkyl group of at least 6 carbon atoms, (2) an ethylenically unsaturated monomer containing a free carboxylic acid group, and (3) an ethylenically unsaturated monomer containing a functional group which forms a conjugated system with its ethylenically unsaturated bond and is hydrolyzable to a free carboxylic group, such as, for example, perfluorooctyl N-ethyl sulfonamide methacrylate/acrylic acid/octadecyl acrylate, as described in U.S. Pat. No. 3,318,852, also incorporated herein by reference.

As used in U.S. Pat. No. 2,607,711, "higher-alkyl" means a long chain alkyl radical having a length of at least 12 carbon atoms. As used herein, the terms "copolymer", "copolymerized", and the like refer to molecules formed when two or more unlike monomers are polymerized together.

The second necessary component of my backsize coating is an ink anchoring resin, which comprises a cellulose ester. Examples thereof include cellulose acetate, cellulose acetate propionate and cellulose acetate butyrate, such materials being commercially available and produced in grades which vary in acetyl content, butyryl content, hydroxyl content and viscosity. I have found that to function effectively as an ink anchoring resin, the cellulose ester must have at least about 0.5 percent by weight hydroxyl groups therein, and preferably about 1.5 percent. Another ink anchoring resin that is useful in my invention is cellulose nitrate, which is also commercially available.

The third component is a primer for insuring proper adhesion of the backsize coating to the tape backing, and which is chosen in accordance with the chemical makeup of the backing utilized in the tape construction. For example, when the film backing is polypropylene or unplasticized polyvinyl chloride, the primer is selected from a series of commercially available chlorinated polyolefins in a xylene solution, or solid chlorinated polypropylene. Commercially available chlorinated polyolefins comprise chlorinated polyethylene, chlorinated polypropylene, chlorinated polybutylene, and mixtures thereof. When the backing is polyethylene terephthalate, the primer is selected from commercially available copolyester resins.

To prepare a suitable backsize coating, it is apparent that the correct selection of the combination of LAB, ink anchoring resin and primer is critical. A minimum amount of both LAB and ink anchoring resin must be present on the surface of the backsize coating to insure both the easy release and the ink acceptance characteristics. Further, both the LAB and ink anchoring resin must sufficiently adhere to the tape backing to preclude separation of the backing and backsize coating as the tape is being unwound. The primer is included to insure this level of adhesion. Because the surface of the backsize coating, in contrast to the bulk thereof, accounts for the release and ink acceptance characteristics of the backsize coating, any backsize coating composition having one particular component that has considerably lower surface energy than the other components of the composition (which particular component is further present in a greater than negligible concentration) will exhibit a surface characterized by the properties of that lower surface energy component. For that reason, the surface energy of each component in the backsize coating should be similar, i.e., within 10 percent of each other. For example, if the surface energy of the LAB is acceptable for release characteristics, but is also more ular coating method employed. The principal solvents in the ternary mixture are toluene, xylene and methyl ethyl ketone. Typically, the ketone is utilized to solvate the ink anchoring resin while xylene and toluene can solvate the other components.

To prevent gellation tendencies of the preferred components and to insure a smooth, uniform coating of the backsize, it is important that the ternary mixture maintain a solvent composition wherein the toluene plus xylene weight ratio to methyl ethyl ketone is at least about 3:1, preferably about 5:1, but can be as high as about 8:1. In the following examples, this ratio is illustrated as follows (T+X):MEK.

Normally, the primer solution is charged to a mixing vessel followed by the resin solution in MEK, and after sufficient mixing, the LAB solution and additional solvent are added to complete the ternary blend. To insure homogeneity, the ternary blend typically requires agitation prior to coating, in conventional fashion.

GENERAL COATING PROCEDURE

The ternary backsize solutions of my invention are coated onto the backside of a film which will become the tape backing prior to the coating of a PSA to the faceside thereof. A conventional rotogravure roll coater can be used, which accurately meters the quantity of coating solution applied to the backing, and insures a uniform and continuous coating application.

In all of the following examples, a gravure roller consisting of a 200 line pyramidally knurled or a ruling mill or quadrangular cell roll was utilized and the coatings were applied at a machine speed of 20 yards/minute using solutions ranging in solids content from a low of 2.5 percent to a high of 21.8 percent. The coatings were then dried in an oven at 190° F. for 1.5 minutes prior to winding the coated film in roll form.

These coating conditions resulted in backsize coatings which ranged in thickness from about 200 to about 800 nanometers.

The film backings utilized were either corona treated biaxially oriented polypropylene (BOPP), untreated polyethylene terephthalate (PET), or unplasticized polyvinyl chloride (UPVC). Film thicknesses ranged from 1 to 2 mils. The faceside of each film was then coated with a PSA, a conventional block copolymer system similar to those described in U.S. Pat. No. 3,239,478. The PSA was coated at a rate resulting in coating weights of 17 to 34 grams per meter$^2$.

The completed PSA tape was in the form of a 12 inch wide roll which was slit to rolls of 2 inch width and 60 yard length for evaluation and testing.

INK REMOVAL TESTS

A conventional flexographic printer, the SIAT L3 Printer, commercially available from Flexo Printing Equipment Corp., was used to print the backside of the test tape rolls. The ink utilized in the test procedure was "Flexotuf" Purple F82300 or Black F82296, available from the Inmont Corporation. Printing was carried out at a machine speed of 20 yards/minute. The printed indicia used in the test procedure covered 70 percent of the area of the tape backside. Following printing, the tape was dried inline at ambient temperature about 10 seconds before it was rewound in roll form for storage. The thus printed rolls were then stored for one week at 75° F. before removed for testing. The rolls of tape were unwound by hand at a rate consistent with normal tape application procedures. The quantity of ink removed was determined subjectively by visual observation, and tapes exhibiting no more than about 5 percent ink removal by this test were considered acceptable.

UNWIND AND ADHESION TESTS OF UNPRINTED TAPE

Unwind forces are measured as the tape is unwound from the backsize-coated roll prior to printing. The adhesion test is performed by unwinding a roll of tape coated in accordance with my invention and applying a length of the tape to a polished steel surface followed by removal therefrom.

Both of these tests are described in detail in the Seventh Edition of "Test Methods For Pressure Sensitive Tapes", copyright 1976, Pressure Sensitive Tape Counsel, Glenview, Ill. The test for unwind force is designated PSTC-8, while the adhesion test is designated PSTC-1, in accordance with procedures outlined in the foregoing publication.

In the examples, ODA:AA is an octadecyl acrylate:acrylic acid copolymer, FC:AA:ODA is a perfluorooctyl N-ethyl sulfonamido methacrylate:acrylic acid:octadecyl acrylate polymer, and VOC is a polyvinyl N-octadecyl carbamate.

The "CAB" materials are cellulose acetate butyrates from Eastman Chemical, the "CAP" material is cellulose acetate propionate from Eastman Chemical, NC-RS-5-6 is cellulose nitrate from Hercules, Inc., CP 343-1 is a chlorinated polyolefin from Eastman Chemical, and Vitel PE-222 is a copolyester from Goodyear Chemical.

Examples 1–66

| | BACKSIZE SOLUTION | | | | | | | | | | | |
|---|---|---|---|---|---|---|---|---|---|---|---|---|
| | SOLVENT | | L.A.B. % | | | Ink Anchoring Resin % | | | | | PRIMER % | |
| Examples | % SOLID | (T + X): MEK | ODA:AA | FC: AA:ODA | VOC | CAB 381-0.1 | CAB 531-1 | CAB 551-0.2 | CAP 482-0.5 | NC RS-5-6 | CP 343-1 | Vitel PE-222 |
| 1. 2 mil BOPP | 2.5 | | | | 100 | | | | | | | |
| 2. 1.2 mil BOPP | 2.5 | | | | 100 | | | | | | | |
| 3. 2 mil BOPP | 2.5 | | 100 | | | | | | | | | |
| 4. 2 mil BOPP | 2.5 | | | 100 | | | | | | | | |
| 5. 1 mil PET | 2.5 | | | | 100 | | | | | | | |
| 6. 1 mil PET | 21.8 | 3.4 | | 17 | | 19 | | | | | | 14 |
| 7. 1 mil PET | 21 | 3.3 | | 33 | | 48 | | | | | | 19 |
| 8. 2 mil PET | 10 | 5.0 | 30 | | | 50 | | | | | | 20 |
| 9. 2 mil PET | 6 | 4.0 | 30 | | | 50 | | | | | | 20 |
| 10. 2 mil PET | 15 | 5.0 | 33 | | | 47 | | | | | | 20 |
| 11. 2 mil BOPP | 9 | 5.0 | 15 | | | 52 | | | | | 33 | | than 10 percent lower than the surface energy of the ink anchoring resin, printing on the surface of the backsize coating will be difficult. If the surface energy of the ink anchoring resin in acceptable for ink acceptance, but is also more than 10 percent lower than the surface energy of the LAB, the backsize coating will not provide the release characteristics required for easy unwind. I have discovered that measurement of the surface free energy of each of these components individually in cast film form, by utilizing a contact angle technique according to the test method described hereafter allows for this critical selection. When the surface free energy of the ink anchoring resin and the primer are within ten percent (either above or below) of the surface free energy of the LAB, I have discovered that the unique balance of ink anchoring properties and low unwind release force is achieved, and thus the tape formed therefrom is directly printable.

DETERMINATION OF SURFACE FREE ENERGY OF A POLYMERIC FILM BY CONTACT ANGLE MEASUREMENTS

The theoretical background for this test, and a comprehensive treatment of solid surface energy measurements is discussed in Chapters VII and X of "Physical Chemistry of Surfaces", Fourth Edition, Arthur W. Adamson, U.C.L.A., Wiley-Interscience Publication, 1982.

Samples are prepared by separately coating from solution the LAB, ink anchor resin and primer onto a smooth flexible backing with a conventional adhesive roll coater. Samples of the coated film are then cut into one-half inch by two and one-half inch rectangular sheets for placement in the Gaertner Contact Angle Goniometer, commercially available from Gaertner Scientific Corp.

Four probing liquids of varying polarity, and having known surface energy values, were used for the contact angle measurements. The probing liquids were water, glycerol, furfuryl alcohol, and 1-bromonaphthalene. Averages of four measurements for each of the liquids on each of the coated film surfaces yielded the contact angle ($\theta$), which was then substituted in the equation:

$$\frac{\gamma_{LG}(1 + \cos\theta)}{2(\gamma_{LG}^d)^{\frac{1}{2}}} = \left(\frac{\gamma_{LG}^p}{\gamma_{LG}^d}\right)^{\frac{1}{2}} (\gamma_S^p)^{\frac{1}{2}} + (\gamma_S^d)^{\frac{1}{2}}$$

wherein $\gamma_{LG}$ is the surface energy of the liquid-gas interface, $\gamma_{LG}^p$ is the polar component of the surface energy of the liquid-gas interface, $\gamma_{LG}^d$ is the dispersion component of the surface energy of the liquid-gas interface, $\gamma_S^p$ is the polar component of the surface energy of the sample coating and $\gamma_S^d$ is the dispersion component of the surface energy of the sample coating. Plotting $$\frac{\gamma_{LG}(1 + \cos\theta)}{2(\gamma_{LG}^d)^{\frac{1}{2}}} \text{ against } \left(\frac{\gamma_{LG}^p}{\gamma_{LG}^d}\right)^{\frac{1}{2}}$$

provides a straight line, the slope of which is $\gamma_S^p$ and the intercept thereof is $\gamma_S^d$, the sum of the two thus providing the total surface energy of the sample coatings.

The coordinates for the plotting, based on each liquid, are as follows:

| Probing liquid | Y Coordinate $\frac{\gamma_{LG}(1 + \cos\theta)}{2\gamma(\gamma_{LG}^d)^{\frac{1}{2}}}$ | X Coordinate $\left(\frac{\gamma_{LG}^p}{\gamma_{LG}^d}\right)^{\frac{1}{2}}$ |
|---|---|---|
| Water | 7.80 (1 + cos $\theta$) | 1.53 |
| Glycerol | 6.98 (1 + cos $\theta$) | 2.08 |
| Furfuryl Alcohol | 3.95 (1 + cos $\theta$) | 0.77 |
| 1-Bromonaphthalene | 3.37 (1 + cos $\theta$) | 0.19 |

In accordance with the foregoing, it has been determined that the surface free energy for LABs disclosed in U.S. Pat. No. 2,607,711 are as follows:

| | ergs/centimeter$^2$ |
|---|---|
| octadecyl acrylate/acrylic acid | 42.7 |
| octadecyl acrylate/methyl-methacrylate/acrylic acid | 43.7 |
| octadecyl acrylate/acrylic acid/methyl acrylate/acrylonitrile | 42.4 |

In similar fashion, an LAB disclosed in U.S. Pat. No. 3,318,852, namely perfluorooctyl N-ethyl-sulfonamide methacrylate/acrylic acid/octadecyl acrylate has a surface free energy of 41.6 ergs/centimeter$^2$, and an LAB disclosed in U.S. Pat. No. 2,532,011, namely polyvinyl N-octadecyl carbamate has a surface from energy of 32.2 ergs/centimeter$^2$.

In similar fashion, commercially available cellulose acetate butyrates, namely CAB-381-0.1, CAB-531-1 and CAB-551-0.2, available from the Eastman Chemical Company, have surface free energies of 44.2, 43.4 and 43.8 ergs/centimeter$^2$ respectively. Commercially available cellulose acetate propionate, namely CAP-482-0.5, available from the Eastman Chemical Company, has surface free energy of 44.5 ergs/centimeter$^2$.

In similar fashion, chlorinated polyolefins, namely CP-343-1, commercially available from the Eastman Chemical Company, and "Hardlen" 16-LP, a chlorinated polypropylene, commercially available from Toyo Kasei Kogyo Company, which are known primers for tape film backings, display a surface free energies of 44.1 and 44.0 ergs/centimeter$^2$, respectively. A co-polyester resin, namely Vitel PE-222, commercially available from Goodyear Chemical Company, has a value of 44.9 ergs/centimeter$^2$.

I have found that the backsize should contain at least about 10 percent by weight of LAB, and preferably from about 30 to about 50 percent by weight. This insures reasonableness in terms of the unwind force of the PSA tape. The ink anchoring resin should be present at from about 5 to about 50 percent by weight, with from about 10 to about 30 percent being preferred, to optimize adhesion of the ink. The primer concentration is dependent on the backing utilized. With polypropylene and unplasticized polyvinyl chloride, I have found that from about 30 to about 60 percent by weight is preferred, while with polyethylene terephthalate, from about 15 to about 50 percent is preferred.

PREPARATION OF BACKSIZE SOLUTIONS

The three components of the backsize coating solution are combined typically in solution form. The ternary mixture which results from this combination is adjusted to a solids percentage depending on the partic- -continued

Examples 1-66
BACKSIZE SOLUTION

| Examples | SOLVENT % SOLID | (T + X): MEK | L.A.B. % ODA:AA | FC: AA:ODA | VOC | Ink Anchoring Resin % CAB 381-0.1 | CAB 531-1 | CAB 551-0.2 | CAP 482-0.5 | NC RS-5-6 | PRIMER % CP 343-1 | Vitel PE-222 |
|---|---|---|---|---|---|---|---|---|---|---|---|---|
| 12. 2 mil BOPP | 9 | 3.0 | 24 | | | 42 | | | | | 34 | |
| 13. 2 mil BOPP | 5 | 3.0 | 30 | | | 25 | | | | | 45 | |
| 14. 2 mil BOPP | 11 | 3.0 | 30 | | | 25 | | | | | 45 | |
| 15. 2 mil BOPP | 9 | 5.0 | 33 | | | 15 | | | | | 52 | |
| 16. 2 mil BOPP | 7 | 5.0 | 35 | | | 17 | | | | | 48 | |
| 17. 2 mil BOPP | 7 | 5.0 | 35 | | | 12 | | | | | 53 | |
| 18. 2 mil BOPP | 7 | 5.0 | 35 | | | 7 | | | | | 58 | |
| 19. 2 mil BOPP | 7 | 5.0 | 38 | | | 22 | | | | | 40 | |
| 20. 2 mil BOPP | 10 | 4.0 | 40 | | | 20 | | | | | 40 | |
| 21. 2 mil BOPP | 7 | 5.0 | 40 | | | 10 | | | | | 50 | |
| 22. 2 mil BOPP | 5 | 5.0 | 43 | | | 20 | | | | | 37 | |
| 23. 2 mil BOPP | 7 | 5.0 | 31 | | | | 23 | | | | 46 | |
| 24. 2 mil BOPP | 5 | 5.0 | 35 | | | | 22 | | | | 43 | |
| 25. 1.2 mil BOPP | 8 | 5.0 | 35 | | | | 22 | | | | 43 | |
| 26. 2 mil BOPP | 7 | 5.0 | 35 | | | | 20 | | | | 45 | |
| 27. 2 mil BOPP | 7 | 5.0 | 35 | | | | 15 | | | | 50 | |
| 28. 2 mil BOPP | 7 | 5.0 | 35 | | | | 10 | | | | 55 | |
| 29. 2 mil BOPP | 7 | 5.0 | 35 | | | | 5 | | | | 60 | |
| 30. 2 mil BOPP | 6 | 5.0 | 40 | | | | 20 | | | | 40 | |
| 31. 2 mil BOPP | 7 | 5.0 | 40 | | | | 17 | | | | 52 | |
| 32. 2 mil BOPP | 7 | 5.0 | 43 | | | | 20 | | | | 37 | |
| 33. 2 mil BOPP | 7 | 5.0 | 10 | | | | | 60 | | | 30 | |
| 34. 2 mil BOPP | 7 | 5.0 | 20 | | | | | 55 | | | 25 | |
| 35. 2 mil BOPP | 11 | 3.0 | 27 | | | | | 27 | | | 46 | |
| 36. 2 mil BOPP | 7 | 5.0 | 30 | | | | | 20 | | | 50 | |
| 37. 2 mil BOPP | 13 | 3.0 | 31 | | | | | 23 | | | 46 | |
| 38. 2 mil BOPP | 7 | 5.0 | 35 | | | | | 19 | | | 46 | |
| 39. 2 mil BOPP | 7 | 5.0 | 35 | | | | | 14 | | | 51 | |
| 40. 2 mil BOPP | 7 | 5.0 | 35 | | | | | 9 | | | 56 | |
| 41. 2 mil BOPP | 7 | 5.0 | 40 | | | | | 10 | | | 50 | |
| 42. 2 mil BOPP | 7 | 5.0 | 45 | | | | | 9 | | | 46 | |
| 43. 2 mil BOPP | 7 | 5.0 | 45 | | | | | 5 | | | 50 | |
| 44. 2 mil BOPP | 7 | 5.0 | 50 | | | | | 5 | | | 45 | |
| 45. 2 mil BOPP | 6.6 | 3.5 | 31 | | | | | | 23 | | 46 | |
| 46. 2 mil BOPP | 7 | 3.5 | 35 | | | | | | 21 | | 44 | |
| 47. 2 mil BOPP | 7 | 3.5 | 35 | | | | | | 16 | | 48 | |
| 48. 2 mil BOPP | 7 | 3.5 | 35 | | | | | | 11 | | 54 | |
| 49. 2 mil BOPP | 7 | 3.5 | 35 | | | | | | 6 | | 59 | |
| 50. 2 mil BOPP | 9 | 3.5 | 36 | | | | | | 22 | | 42 | |
| 51. 2 mil BOPP | 8.5 | 3.5 | 40 | | | | | | 20 | | 40 | |
| 52. 2 mil BOPP | 7 | 3.0 | 25 | | | | | | | 25 | 50 | |
| 53. 2 mil BOPP | 7 | 3.0 | 30 | | | | | | | 15 | 55 | |
| 54. 2 mil BOPP | 7 | 3.0 | 35 | | | | | | | 23 | 42 | |
| 55. 2 mil BOPP | 7 | 3.0 | 40 | | | | | | | 10 | 50 | |
| 56. 2 mil BOPP | 9 | 3.0 | 33 | | | 52 | | | | | 15 | |
| 57. 2 mil BOPP | 9 | 3.0 | 34 | | | 40 | | | | | 26 | |
| 58. 2 mil BOPP | 9 | 3.0 | 50 | | | 25 | | | | | 25 | |
| 59. 2 mil BOPP | 7 | 5.0 | | | 40 | 0 | | | | | 60 | |
| 60. 2 mil BOPP | 7 | 5.0 | | | 36 | 11 | | | | | 53 | |
| 61. 2 mil BOPP | 7 | 5.0 | | | 33 | 19 | | | | | 48 | |
| 62. 2 mil BOPP | 7 | 5.0 | | | 20 | 20 | | | | | 60 | |
| 63. 2 mil BOPP | 7 | 5.0 | | | 10 | 20 | | | | | 70 | |
| 64. 1.2 mil BOPP | 18 | 3.2 | | | 34 | 47 | | | | | 19 | |
| 65. 1.2 mil BOPP | 12 | 3.0 | | | 42 | 42 | | | | | 16 | |
| 66. 1.6 mil UPVC | 7 | 5.0 | 35 | | | | | 22 | | | 43 | |

Examples 1-66
TAPE PROPERTIES

| Examples | % Ink REMOVAL | PSCT-8 UNWIND OZ./IN. | PSCT-1 ADHESION OZ./IN. |
|---|---|---|---|
| 1. 2 mil BOPP | 95 | 6 | 55 |
| 2. 1.2 mil BOPP | 95 | 7 | 45 |
| 3. 2 mil BOPP | 90 | 7 | 47 |
| 4. 2 mil BOPP | >95 | 3 | 51 |
| 5. 1 mil PET | 95 | 6.8 | 45 |
| 6. 1 mil PET | 0 | 18 | 64 |
| 7. 1 mil PET | 0 | 6.5 | 62 |
| 8. 2 mil PET | 1 | 7 | 68 |
| 9. 2 mil PET | 1 | 8 | 74 |
| 10. 2 mil PET | 1 | 5 | 71 |
| 11. 2 mil BOPP | 0 | 45 | 50 |
| 12. 2 mil BOPP | 3 | 35 | 51 |
| 13. 2 mil BOPP | 0 | 31 | 52 |
| 14. 2 mil BOPP | 0 | 27 | 50 |
| 15. 2 mil BOPP | 1 | 20 | 58 |
| 16. 2 mil BOPP | 1 | 29 | 63 |
| 17. 2 mil BOPP | 0 | 16 | 61 |
| 18. 2 mil BOPP | 0 | 14 | 57 |
| 19. 2 mil BOPP | 2 | 18 | 64 |
| 20. 2 mil BOPP | 1 | 18 | 59 |

-continued

Examples 1-66
TAPE PROPERTIES

| Examples | % Ink REMOVAL | PSCT-8 UNWIND OZ./IN. | PSCT-1 ADHESION OZ./IN. |
|---|---|---|---|
| 21. 2 mil BOPP | 0 | 14 | 65 |
| 22. 2 mil BOPP | 4 | 21 | 55 |
| 23. 2 mil BOPP | 0 | 18 | 63 |
| 24. 2 mil BOPP | 0 | 16 | 57 |
| 25. 1.2 mil BOPP | 0 | 20 | 44 |
| 26. 2 mil BOPP | 0 | 14 | 56 |
| 27. 2 mil BOPP | 0 | 14 | 64 |
| 28. 2 mil BOPP | 0 | 9 | 60 |
| 29. 2 mil BOPP | 0 | 17 | 59 |
| 30. 2 mil BOPP | 1 | 18 | 59 |
| 31. 2 mil BOPP | 0 | 14 | 64 |
| 32. 2 mil BOPP | 3 | 20 | 59 |
| 33. 2 mil BOPP | 0 | 22 | 56 |
| 34. 2 mil BOPP | 0 | 27 | 54 |
| 35. 2 mil BOPP | 1 | 27 | 60 |
| 36. 2 mil BOPP | 0 | 14 | 50 |
| 37. 2 mil BOPP | 0 | 16 | 56 |
| 38. 2 mil BOPP | 0 | 18 | 64 |
| 39. 2 mil BOPP | 0 | 18 | 61 |
| 40. 2 mil BOPP | 0 | 19 | 66 |
| 41. 2 mil BOPP | 0 | 18 | 60 |
| 42. 2 mil BOPP | 0 | 13 | 54 |
| 43. 2 mil BOPP | 0 | 12 | 60 |
| 44. 2 mil BOPP | 1 | 11 | 54 |
| 45. 2 mil BOPP | 0 | 23 | 56 |
| 46. 2 mil BOPP | 0 | 24 | 61 |
| 47. 2 mil BOPP | 0 | 25 | 63 |
| 48. 2 mil BOPP | 0 | 18 | 62 |
| 49. 2 mil BOPP | 0 | 24 | 63 |
| 50. 2 mil BOPP | 0 | 25 | 59 |
| 51. 2 mil BOPP | 2 | 24 | 58 |
| 52. 2 mil BOPP | 0 | 23 | 56 |
| 53. 2 mil BOPP | 0 | 24 | 58 |
| 54. 2 mil BOPP | 1 | 26 | 60 |
| 55. 2 mil BOPP | 1 | 27 | 63 |
| 56. 2 mil BOPP | 50 | 15 | 36 |
| 57. 2 mil BOPP | 10 | 32 | 54 |
| 58. 2 mil BOPP | 30 | 26 | 48 |
| 59. 2 mil BOPP | 98 | 5 | 60 |
| 60. 2 mil BOPP | 98 | 5 | 56 |
| 61. 2 mil BOPP | 98 | 6 | 52 |
| 62. 2 mil BOPP | 98 | 7 | 58 |
| 63. 2 mil BOPP | 98 | 10 | 48 |
| 64. 1.2 mil BOPP | 98 | 5 | 45 |
| 65. 1.2 mil BOPP | 95 | 6 | 40 |
| 66. 1.6 mil UPVC | 0 | 24 | 50 |

I claim:

1. A pressure-sensitive tape comprising a non-fibrous backing, a layer of normally tacky and pressure-sensitive adhesive coated over and firmly adherently bonded to the face side of said backing, and a low adhesion backsize composition coated over and firmly adherently bonded to the backside of said backing, said low adhesion backsize composition being a mixture of at least one low adhesion backsize compound, wherein said low adhesive backsize compound comprises at least about 10 percent by weight of said composition and is selected from the group consisting of (A) a higher-alkyl acrylate or higher-alkyl methacrylate ester copolymerized with at least one ethylenically unsaturated monomer, and (B) a terpolymer of (1) an ethylenically unsaturated monomer containing a fluoroalkyl group of at least 6 carbon atoms, (2) an ethylenically unsaturated monomer containing a free carboxylic acid group, and (3) an ethylenically unsaturated monomer containing a functional group which forms a conjugated system with its ethylenically unsaturated bond and is hydrolyzable to a free carboxylic group, an ink anchoring resin, comprising a cellulose ester having at least about 0.5 percent by weight of hydroxyl groups and comprising from about 5 to about 50 percent by weight of said composition, and a primer selected from the group consisting of chlorinated polyolefin and copolyester resin, wherein said ink anchoring resin and said primer have free surface energies within about 10 percent of the free surface energy of said low adhesion backsize compound.

2. The tape of claim 1 further containing flexographic ink indicia firmly adhered to the surface of said backsize coating.

3. The tape of claim 1 wherein said cellulose ester is selected from the group consisting of cellulose acetate, cellulose acetate propionate, cellulose acetate butyrate, and cellulose nitrate.

4. The tape of claim 1 wherein said backing is polypropylene, said primer is a chlorinated polyolefin and is present in said backsize coating at a concentration of from about 30 to about 60 percent by weight.

5. The tape of claim 1 wherein said backing is polyethylene terephthalate, said primer is a copolyester resin, and is present in said backsize coating at a concentration of from about 15 to about 50 percent by weight.

6. The tape of claim 1 wherein said backing is unplasticized polyvinyl chloride, said primer is a chlorinated polyolefin and is present in said backsize coating at a concentration of from about 30 to about 60 percent by weight.

7. A composition capable of providing a backsize coating on the backing of a pressure-sensitive adhesive tape comprising a mixture of at least one low adhesion backsize compound, wherein said low adhesion backsize compound comprises at least about 10 percent by weight of said composition and is selected from the group consisting of (A) a higher-alkyl acrylate or higher-alkyl methacrylate ester copolymerized with at least one ethylenically unsaturated monomer, and (B) a terpolymer of (1) an ethylenically unsaturated monomer containing a fluoroalkyl group of at least 6 carbon atoms, (2) an ethylenically unsaturated monomer containing a free carboxylic acid group, and (3) an ethylenically unsaturated monomer containing a functional group which forms a conjugated system with its ethylenically unsaturated bond and is hydrolyzable to a free carboxylic group, an ink anchoring resin, comprising a cellulose ester having at least about 0.5 percent by weight of hydroxyl groups and comprising from about 5 to about 50 percent by weight of said composition, and a primer selected from the group consisting of chlorinated polyolefin and copolyester resin, said mixture being capable of providing a directly printable surface on said backing, wherein the surface free energy of said ink anchoring resin and said primer are within about 10 percent of the surface free energy of said low adhesion backsize compound.

8. The composition of claim 1 wherein said cellulose ester is selected from the group consisting of cellulose acetate, cellulose acetate propionate, cellulose acetate butyrate, and cellulose nitrate.

* * * * *

UNITED STATES PATENT AND TRADEMARK OFFICE
CERTIFICATE OF CORRECTION

PATENT NO. : 4,587,156

DATED : May 6, 1986

INVENTOR(S) : Maan-shii S. Wu

It is certified that error appears in the above-identified patent and that said Letters Patent is hereby corrected as shown below:

Col. 3, line 66 "and" should read --or--.

Col. 3, line 68 "or" should read --and--.

Col. 6, line 30 "from" should read --free--.

Signed and Sealed this

Twenty-third Day of September 1986

[SEAL]

Attest:

DONALD J. QUIGG

Attesting Officer

Commissioner of Patents and Trademarks